Figure 1:
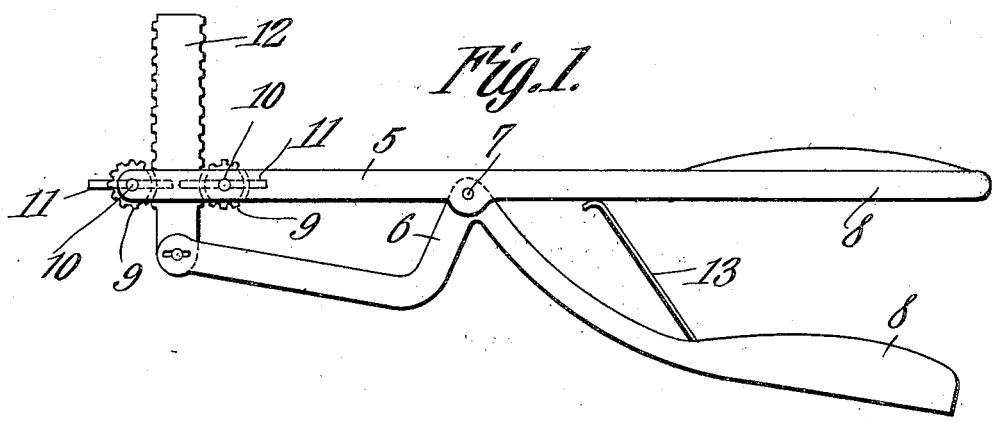

T. H. HOOD.
MIXER.
APPLICATION FILED NOV. 16, 1908.

921,991.

Patented May 18, 1909.

Witnesses

Inventor
Tom H. Hood.
By C. A. Snow & Co.
Attorneys

UNITED STATES PATENT OFFICE.

THOMAS HUBERT HOOD, OF WORTHAM, TEXAS.

MIXER.

No. 921,991.     Specification of Letters Patent.     Patented May 18, 1909.

Application filed November 16, 1908. Serial No. 462,843.

*To all whom it may concern:*

Be it known that I, THOMAS HUBERT HOOD, a citizen of the United States, residing at Wortham, in the county of Freestone and State of Texas, have invented a new and useful Mixer, of which the following is a specification.

This invention relates to that class of mixers characterized by a compound rotary dasher.

The object of the present invention is to provide in a device of this kind, improved means for operating the dasher so that the device may be held in, and operated by one hand, leaving the other hand free to hold the receptacle containing the liquid or other substance to be mixed; and with this object in view, the invention consists in a novel combination and arrangement of parts to be hereinafter described and claimed, reference being had to the drawing hereto annexed, in which:—

Figure 2:
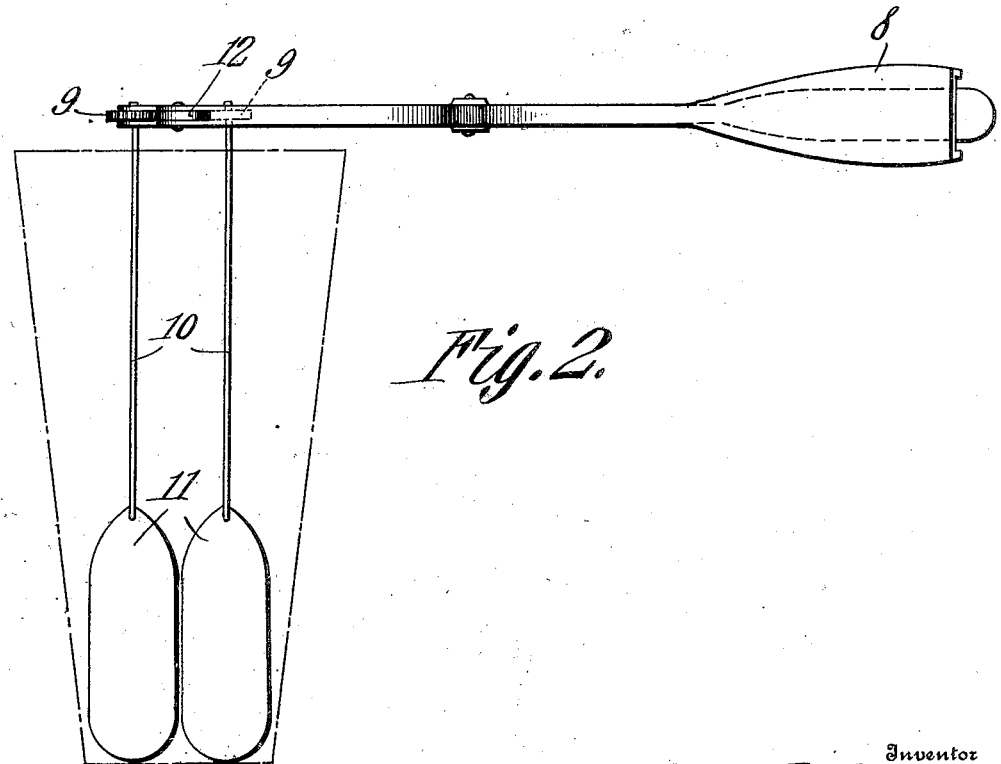

Figure 1 is a plan view, and Fig. 2 an edge view of the mixer.

Referring more particularly to the drawing, 5 and 6 denote the handles of the mixer. They are so proportioned that they may be readily held in one hand, and they are pivotally connected intermediate their ends as indicated at 7. The inner ends of the handles are formed with grips 8.

The outer end of the handle 5 is slotted, and in said slot is mounted a pair of pinions 9 carried respectively by the dasher-shafts 10.
The dashers 11 may be of any suitable form or shape. The pinions 9 are spaced apart edgewise, and between them a rack-bar 12 works, said rack-bar being in mesh with both pinions, it being provided with teeth on both edges for this purpose. The rack-bar 12 is pivotally connected at one end to the outer end of the handle 6 by reason of which it will be reciprocated when the handles are alternately opened and closed. For opening the handles I provided a spring 13 which is connected to the grip portion of the handle 6, and bears on the grip portion of the handle 5. When pressure on the handles is released, they are opened by the spring and are normally held thereby in this position. The handle 5 is straight, and the grip portion of the handle 6 extends in a curve from the pivot 7. The other portion of the handle 6 which carries the rack-bar 12 is angular.

It will be seen from the foregoing that I have provided a mixing device which is simple in structure which can be easily operated, it being necessary only to grasp the device in one hand and open and close the handles by alternately gripping and releasing the same. The other hand is therefore left free to hold the receptacle containing the liquid or other substance to be mixed. The opening and closing movement of the handles reciprocates the rack-bar 12 and through the gears 9 imparts an alternating rotary movement to the dasher shafts 10, said shafts turning in opposite directions.

What is claimed is:—

A mixer comprising a pair of handles pivotally connected intermediate their ends, one of the ends of said handles being formed with grips, and the opposite end of one of said handles having a transversely extending slot, a rack bar carried by the adjacent end of the other handle, a pair of pinions mounted in the aforesaid slot, and in mesh with the rack bar on opposite sides thereof respectively, and dasher shafts carried by the pinions.

In testimony that I claim the foregoing as my own, I have hereto affixed my signature in the presence of two witnesses.

THOMAS HUBERT HOOD.

Witnesses:
   W. J. BRYANT,
   VAN HOO L. STUBBS.